Figure 1:
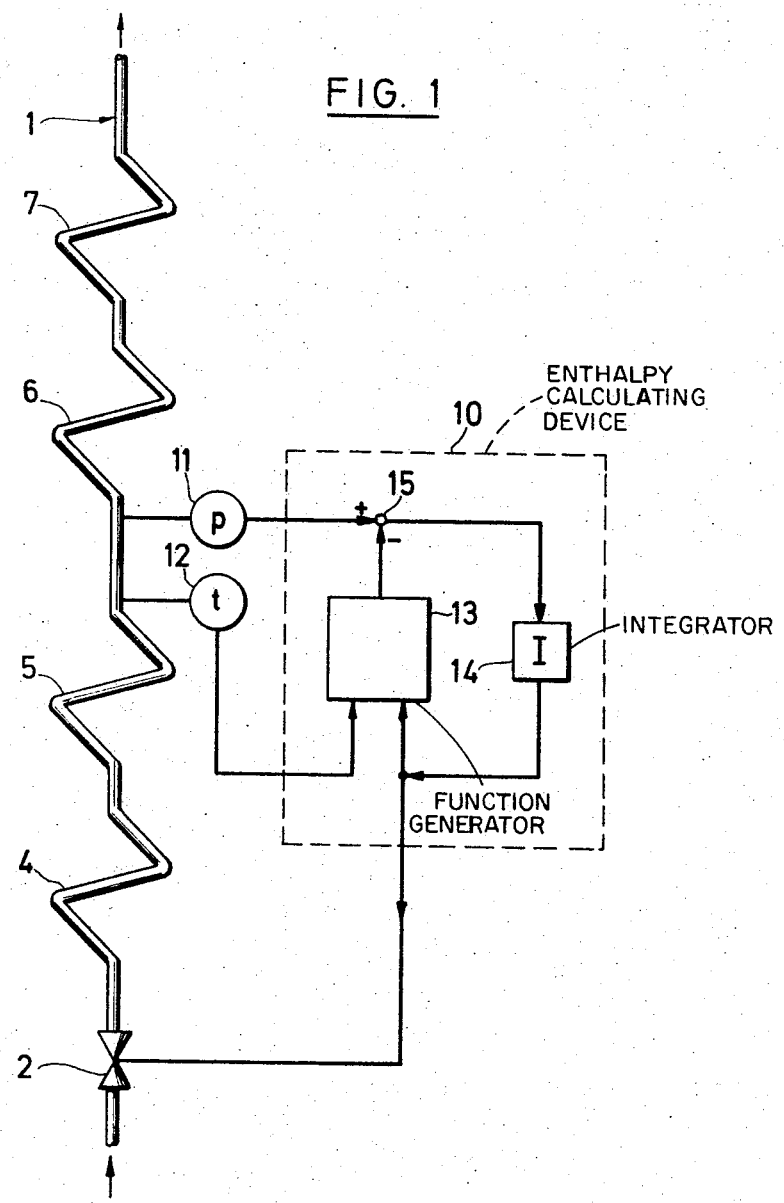

United States Patent [19]
de Vivy

[11] 3,866,026
[45] Feb. 11, 1975

[54] ENTHALPY CALCULATING DEVICE FOR STEAM

[75] Inventor: Dominique le Febve de Vivy, Winterthur, Switzerland

[73] Assignee: Sulzer Brothers Ltd., Winterthur, Switzerland

[22] Filed: Dec. 19, 1973

[21] Appl. No.: 426,055

[30] Foreign Application Priority Data
Dec. 20, 1972 Switzerland........................ 18597/72

[52] U.S. Cl.......... 235/151.1, 23/255 E, 235/151.34
[51] Int. Cl.............................................. G06g 7/57
[58] Field of Search......... 235/151.3, 151.1, 151.34; 73/15 R; 23/230 R, 232 R, 232 E, 254 R, 254 E, 255 R, 255 E

[56] References Cited
UNITED STATES PATENTS
3,204,447  9/1965  Krause et al............................. 73/15
3,436,534  4/1969  Wallace......................... 235/151.3 X
3,639,737  2/1972  McKee............................... 235/151.3
3,768,973  10/1973  Wasilewski........................... 73/15 R

*Primary Examiner*—Joseph F. Ruggiero
*Attorney, Agent, or Firm*—Kenyon & Kenyon Reilly Carr & Chapin

[57] ABSTRACT

The enthalpy calculating device includes a function generator which receives two signals, one representative of either the temperature or pressure property of the steam and the other representative of the enthalpy of the steam for the particular state of the steam. The function generator then emits an output signal corresponding to the other of the temperature or pressure property of the steam. The device also has a controller means composed of a comparator and integrator or an integral action controller. This latter means receives the output of the function generator and compares it with the actual value of the "other" property of the monitored steam. If there is a difference, the output of the controller means is corrected accordingly. This output serves not only as one of the input signals to the function generator but also as the output signal of the device to control the flow of feed water.

16 Claims, 2 Drawing Figures

ENTHALPY CALCULATING DEVICE FOR STEAM

This invention relates to an enthalpy calculating device for steam.

Enthalpy calculating devices for calculating the enthalpy of steam from its temperature and pressure have been known, for example, as "VDI Zeitschrift," No. 14, 1971, pages 1096 – 1099. In the known device, the pressure and temperature variables are supplied to both inputs of an analogue function generator and the enthalpy of the steam is calculated from these variables by means of the function generator. A signal which corresponds to the calculated quantity appears at the output of the device and may then be used, for example, for controlling a supply of feed water to a steam generator. The known device is based on the Koch equilibrium equation for the specific enthalpy which is stated as equation (12) in the aforementioned article. The stated equation includes non-integral exponents which leads to a very complicated and therefore very expensive function generator. Moreover, the enthalpy range covered by the device is relatively narrow because the approximations which have been performed impose limits on the computation accuracy.

Accordingly, it is an object of the invention to provide a relatively simple and inexpensive device for calculating the enthalpy of a flow of steam.

It is another object of the invention to provide an enthalpy calculating device which is able to monitor large ranges of enthalpy.

Briefly, the invention provides an enthalpycalculating device which includes a function generator arranged to provide an output signal representing the magnitude of a first property of steam at a particular state in response to first and second input signals representing the magnitudes of a related second property of the steam at that state and the enthalpy; the first and second properties comprising pressure and temperature. The device also has a first input terminal by which the first input signal can be supplied to the function generator, and a second input terminal by which an input signal corresponding to the first steam property can be supplied. Still further, the device has a controller means connected to this second input and to the function generator for receiving signals from each and for comparing the output of the function generator with the input signal. The output of the controller means is connected to the function generator to provide the second input signal to the function generator and also to an output terminal of the device to provide a signal representative of the enthalpy.

The device operates to maintain the output of the function generator equal to the input signal supplied to the controller means. The value of the second input signal to the function generator required to achieve this is equal to the enthalpy of the steam and is available at the output terminal of the device.

In one embodiment, the function generator is arranged to generate a function of the form:

$$z = a_{00} + a_{01}x + a_{02}x^2 + a_{03}x^3 \ldots + a_{0m}x^m$$
$$+ (a_{10} + a_{11}x + a_{12}x^2 \ldots a_{1m}x^m) \cdot Y$$
$$+ (a_{20} + a_{21}x + \ldots + a_{2m}x^m) \cdot Y^2$$
$$\cdot$$
$$\cdot$$
$$+ (a_{n0} + a_{n1}x + a_{n2}x^2 \ldots + a_{nm}x^m) \cdot Y^n,$$

where $y$ and $x$ are the first and second input signals and $z$ is the output signal. Preferably, the first property is pressure and the second property is temperature. With this arrangement, the function generator must provide an output signal representing pressure in response to input signals representing temperature and enthalpy. Such a function generator need only contain comparatively few elements, and requires no element more complex than a multiplier. The previously known function generators which provide an output signal representing enthalpy, require components for producing exponential functions which are complex and expensive and have serious limitations in accuracy and/or range. A function generator could also be constructed giving a polynomial output function representing enthalpy, but this would require a large number of multipliers.

Figure 2:
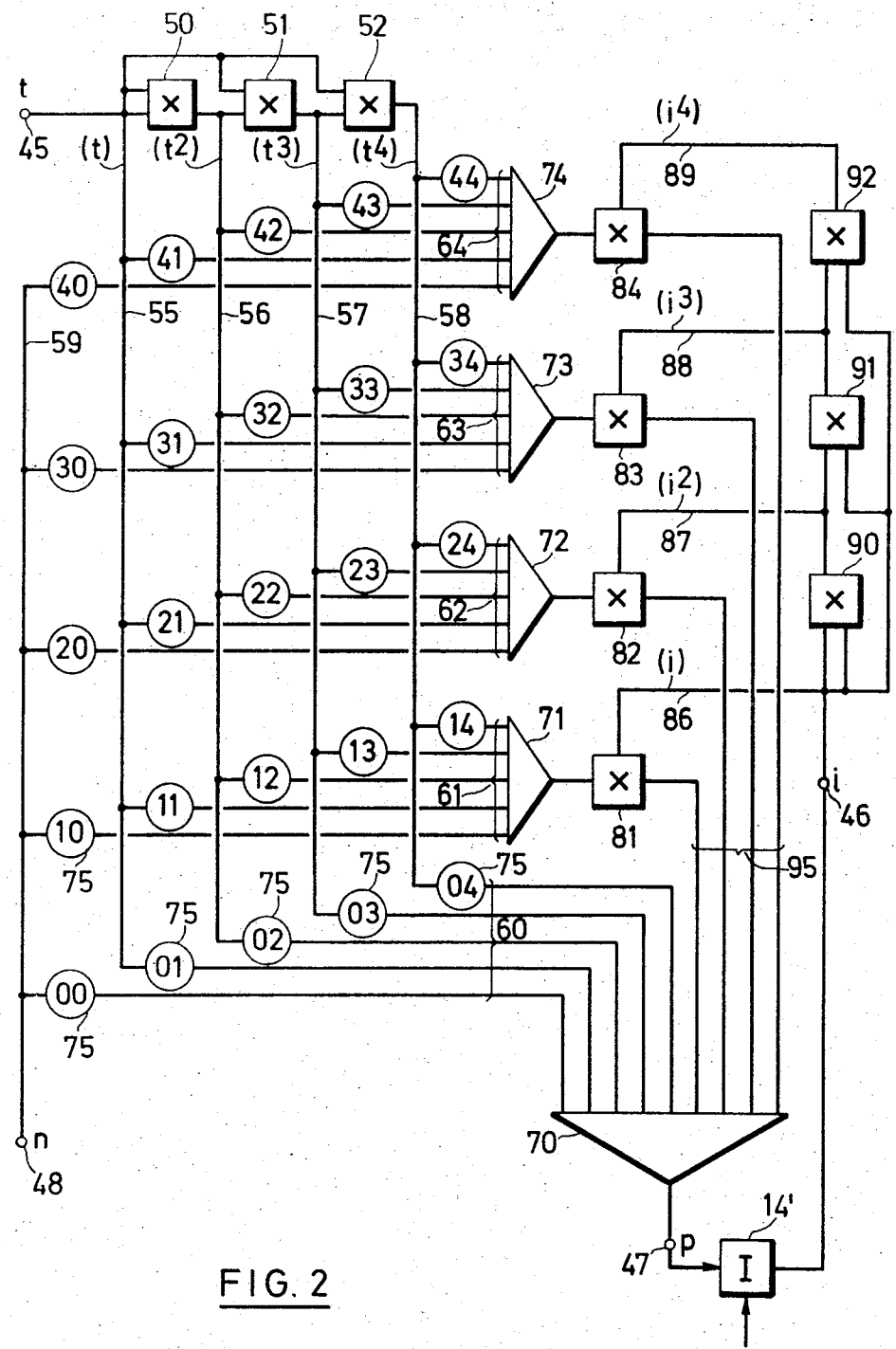

These and other objects and advantages of the invention will become more apparent from the following detailed description and appended claims taken in conjunction with the accompanying drawings in which:

FIG. 1 diagrammatically illustrates an enthalpycalculating device illustrating the principle of the invention, the device being fitted to a forced through-flow steam generator which is also diagrammatically shown; and FIG. 2 illustrates a circuit of an enthalpy-calculating device embodying the invention.

Referring to FIG. 1, the forced through-flow steam generator 1 comprises four serially connected heating surfaces of which the first is an economiser heating surface 4; the second, an evaporator heating surface 5; the third, an inlet superheater heating surface 6 and the fourth, a final superheater surface 7. A supply of feed water to the steam generator 1 is adjusted by means of a feed valve 2 depending on the value of a signal which represents the enthalpy of the steam leaving the evaporator heating surface 5 and is supplied by an enthalpy-calculating device 10.

A temperature sensor 12 and a pressure sensor 11 are provided between the evaporator heating surface 5 and the inlet superheater heating surface 6 and are connected to the device 10. The sensors 11, 12 are arranged to measure the pressure and temperature of a flow of steam at a point in the zone of incipient superheating.

The device 10 comprises a function generator 13, an integrator 14 and a comparator 15. The function generator 13 is arranged to produce a signal representing the pressure of steam at a particular state in response to two input signals representing the temperature and the enthalpy respectively of steam at that state. The two inputs of the function generator 13 are connected to the output of the temperature sensor 12 and to the output of the integrator 14 respectively, while the output of the function generator 13 is connected to one input of the comparator 15. The other input of the comparator 15 is connected to the output of the pressure sensor 11, and the output of the comparator 15 is connected to the input of the integrator 14. The output of the integrator 14 also forms the output of the device 10 which is operatively connected to the feed valve 2.

In operation, if the output of the integrator 14, which is also the output of the device 10, does not accurately represent the enthalpy of the steam, the output of the function generator 13 will differ from the output of the pressure sensor 11. This difference is detected by the comparataor 15 and integrated by the integrator 14, in such a sense that the error in the integrator output is reduced. Thus, the output of the device 10 is continually corrected to give an accurate indication of the enthalpy of the steam.

Referring to FIG. 2, instead of using a separate integrator and comparator as a controller means, an integral-action controller 14' can be used. This controller 14' is supplied separately with the signal from the function generator 13 and with the signal from the pressure sensor 11 so that the comparison between these two signals takes place within the integral-action controller 14'.

The circuit of the function generator 13 is based on the following equation:

$$p = a_{00} + a_{01}t + a_{02}t^2 + a_{03}t^3 + a_{04}t^4$$
$$+ (a_{10} + a_{11}t + a_{12}t^2 + a_{13}t^3 + a_{14}t^4) \cdot i$$
$$+ (a_{20} + a_{21}t + a_{22}t^2 + a_{23}t^3 + a_{24}t^4) \cdot i^2$$
$$+ (a_{30} + a_{31}t + a_{32}t^2 + a_{33}t^3 + a_{34}t^4) \cdot i^3$$
$$+ (a_{40} + a_{41}t + a_{42}t^2 + a_{43}t^3 + a_{44}t^4) \cdot i^4$$

where $p$ denotes pressure, $t$ temperature and $i$ enthalpy.

The function generator 13 receive the input signals $t$ and $i$ at terminals 45 and 46 respectively and also receives a unit reference signal $n$ at a terminal 48. The output signal $p$ is provided at a terminal 47.

A chain of three multipliers 50, 51, 52 is connected to the point 45. The temperature signal $t$ is multiplied by itself in the multiplier 50 so that the product $t^2$ appears at the output. This product is again multiplied by the temperature signal $t$ in the multiplier 51 to produce the product $t^3$. The product $t^4$ is similarly formed in the multiplier 52. Four signal distribution lines 55, 56, 57 and 58 branch off from the chain of three multipliers 50 to 52 and carry the signals $t$, $t^2$, $t^3$ or $t^4$ respectively.

A signal distribution line 59 for the signal $n$ extends from the point or input terminal 48 parallel to the previously mentioned lines 55 to 58.

Five groups of signal branch lines branch off the distribution lines 55 to 59. Each group consists of five signal branch lines 60, 61, 62, 63 or 64 and each of the lines within a group is connected to a different one of the distribution lines 55 to 59. Each of the branch lines extends through a scaler 75 to an adder 70, 71, 72, 73 or 74; all the branch lines within a group are connected to the same adder. The scalers can be potentiometers, for example.

The scaling constant of each scaler is made equal to the corresponding coefficient $a$ in the equation above. The numbers in the circle representing each scaler indicate which of the coefficients corresponds to a particular scaler.

The arrangement as described so far will provide five signals at the inputs of each of the adders 71 to 74 corresponding to the terms within one of the brackets of the equation above. Therefore, the output of each of the adders 71 to 74 will correspond to the complete expression within one of the brackets. The expressions within brackets in the second to fifth lines of the equation are represented by the outputs of the adders 71 to 74, respectively.

A chain of three multipliers 90, 91 and 92 is connected to the terminal 46, and operates in a similar manner to the chain of multipliers 50, 51 and 52 to generate signals corresponding to $i^2$, $i^3$ and $i^4$, respectively. The signals from the terminal 46 and the multipliers 90, 91 and 92 are then supplied over signal lines 86 to 89 respectively to one input of multipliers 81 to 84, respectively. Since the other inputs of the multipliers 81 to 84 are connected to the outputs of the adders 71 to 74 respectively, the outputs of the multipliers 81 to 84 represent the complete expressions in the second to fifth lines, respectively, of the equation above. The outputs of the multipliers 81 to 84 are connected by lines 95 to four further inputs of the adder 70. Since the five previously-mentioned inputs of the adder 70 receive signals corresponding to the terms in the first line of the equation, the output of the adder 70 represents $p$.

As shown, the function generator 13 requires only ten multipliers and five adders.

It is also possible for one input of the function generator 13 to be supplied with the measured pressure instead of with the measured temperature and for the output of the function generator 13 to be compared with the measured temperature.

It is also possible for the output signal of the device 10 to be supplied to a feed water rate regulating circuit instead of being supplied directly to the feed valve 2. The known arrangement of a pressure difference regulating valve and a feed regulating valve is also possible in this respect.

What is claimed is:

1. An enthalpy-calculating device for calculating the enthalpy of steam including a function generator for receiving a first input signal corresponding to the magnitude of the temperature of the steam and a second input signal corresponding to the magnitude of the enthalpy of the steam, and for emitting an output signal corresponding to the determined magnitude of the pressure of the steam in response to said input signals;

a first input terminal for receiving said first input signal for emission to said function generator;

a second input terminal for receiving an output signal corresponding to the magnitude of the pressure of the monitored steam; and a controller means connected to said second input terminal to receive said input signal therefrom and to said function generator to receive the emitter output signal thereof for comparing said respective signals, said controller means having an output terminal for emitting said second input signal in response to a comparison of said respective signals to said function generator and to an output terminal of said device.

2. A device as set forth in claim 1 in which said function generator is arranged to generate a function of the form:

$$z = a_{00} + a_{01}x + a_{02}x^2 + a_{03}x^3 \ldots + a_{0m}x^m$$
$$+ (a_{10} + a_{11}x + a_{12}x^2 \ldots + a_{1m}x^m) \cdot Y$$
$$+ (a_{20} + a_{21}x + \ldots + a_{2m}x^m) \cdot Y^2$$
$$\cdot$$
$$\cdot$$
$$+ (a_{n0} + a_{n1}x + a_{n2}x^2 \ldots + a_{nm}x^m) \cdot Y^n,$$

where $y$ and $x$ are said first and second input signals and $z$ is said output signal.

3. A device as set forth in claim 1 in combination with a forced through-flow steam generator, said first and second input terminals being connected respectively to temperature and pressure sensors arranged to measure the temperature and pressure of steam at a point in said steam generator, and said output terminal of said device being operatively connected to a means in said generator for adjusting a supply of feed water to said steam generator.

4. The combination as set forth in claim 3 wherein said point is in the zone of incipient superheating in said steam generator.

5. An enthalpy calculating device for calculating the enthalpy of steam including
- a first input terminal for receiving a first input signal corresponding to the magnitude of the temperature of a monitored flow of steam;
- a second input terminal for receiving a second input signal corresponding to the magnitude of the pressure of the flow of steam;
- a function generator having a pair of input terminals for receiving signals corresponding to the magnitude of the enthalpy and the temperature of the monitored flow of steam and an output terminal for emitting a signal corresponding to the magnitude of the pressure of the monitored flow of steam;
- a controller means having a pair of input terminals for receiving signals corresponding to the output of said function generator and the magnitude of the pressure of the flow of steam and an output terminal for emitting an output signal corresponding to the enthalpy of the monitored flow of steam;
- said function generator having one of said input terminals thereof connected to said first input terminal to receive said first input signal, the other of said input terminals thereof connected to said output terminal of said controller means to receive said output signal thereof, and said output terminal thereof connected to an input terminal of said controller means to emit said signal corresponding to the determined magnitude of the pressure of the monitored flow of steam thereto;
- said controller means having the other of said input terminals thereof connected to said second input of said device to receive said second input signal and having said output terminal thereof connected to said output terminal of said device to emit said output signal thereto.

6. A device as set forth in claim 5 wherein said controller means includes a comparator and an integrator, said comparator being connected to said output terminal of said function generator to receive said output signal corresponding to the enthalpy and to said second input terminal to receive said second input signal for comparison with said output signal, said integrator being connected to said comparator to receive a difference signal for integration in response to a deviation of said output signal of said function generator from said second input signal, said integrator being connected to said second input of said function generator.

7. A device as set forth in claim 5 wherein said controller means is an integral action controller.

8. A device as set forth in claim 5 in which said function generator generates a function of the form:
$$z = a_{00} + a_{01}x + a_{02}x^2 + a_{03}x^3 \ldots + a_{0m}x^m$$
$$+ (a_{10} + a_{11}x + a_{12}x^2 \ldots + a_{1m}x^m) \cdot Y$$
$$+ (a_{20} + a_{21}x + \ldots + a_{2m}x^m) \cdot Y^2$$
$$\vdots$$
$$+ (a_{n0} + a_{n1}x + a_{n2}x^2 \ldots + a_{nm}x^m) \cdot Y^n,$$
where $y$ and $x$ are said first and second input signals and $z$ is said otput signal.

9. An enthalpy-calculating device for calculating the enthalpy of steam including
- a function generator for receiving a first input signal corresponding to the magnitude of the pressure of the steam and a second input signal corresponding to the magnitude of the enthalpy of the steam, and for emitting an output signal corresponding to the determined magnitude of the temperature of the steam in response to said input signals;
- a first input terminal for receiving said first input signal for emission to said function generator;
- a second input terminal for receiving an input signal corresponding to the magnitude of the temperature of the monitored steam; and
- a controller means connected to said second input terminal to receive said input signal therefrom and to said function generator to receive the emitted output signal thereof for comparing said respective signals, said controller means having an output termeinal for emitting said second input signal in response to a comparison of said respective signals to said function generator and to an output terminal of said device.

10. A device as set forth in claim 9 in which said function generator is arranged to generate a function of the form:
$$z = a_{00} + a_{01}x + a_{02}x^2 + a_{03}x^3 \ldots + a_{0m}x^m$$
$$+ (a_{10} + a_{11}x + a_{12}x^2 \ldots + a_{1m}x^m) \cdot Y$$
$$\vdots$$
$$+ (a_{n0} + a_{n1}x + a_{n2}x^2 \ldots + a_{nm}x^m) \cdot Y^n,$$
where $y$ and $x$ are said first and second input signals and $z$ is said output signal.

11. A device as set forth in claim 9 in combination with a forced through-flow steam generator, said first and second input terminals being connected respectively to temperature and pressure sensors arranged to measure the temperature and pressure of steam at a point in said steam generator, and said output terminal of said device being operatively connected to a means in said generator for adjusting a supply of feed water to said steam generator.

12. The combination as set forth in claim 11 wherein said point is in the zone of incipient superheating in said steam generator.

13. An enthalpy-calculating device for calculating the enthalpy of steam including
- a first input terminal for receiving a first input signal corresponding to the magnitude of the pressure of a monitored flow of steam;
- a second input terminal for receiving a second input signal corresponding to the magnitude of the temperature of the flow of steam;
- an output terminal for emitting an output signal corresponding to the enthalpy of the monitored flow of steam;
- a function generator having a pair of input terminals for receiving signals corresponding to the magnitude of the enthalpy and the pressure of the monitored flow of steam and an output terminal for emitting a signal corresponding to the magnitude of the temperature of the monitored flow of steam;
- a controller means having a pair of input terminals for receiving signals corresponding to the measured output of said function generator and the magnitude of the temperature of the flow of steam and an output terminal for emitting an output signal corresponding to the measured enthalpy of the monitored flow of steam;
- said function generator having one of said input terminals thereof connected to said first input terminal to receive said first input signal, the other of said input terminals thereof connected to said output terminal of said controller means to receive said output signal thereof, and said output terminal thereof connected to an input terminal of said controller means to emit said signal corresponding to the determined magnitude of the temperature of the monitored flow of steam thereto;

said controller means having the other of said input terminals thereof connected to said second input of said device to receive said second input signal and having said output terminal thereof connected to said output terminal of said device to emit said output signal thereto.

14. A device as set forth in claim 13 wherein said controller means includes a comparator and an integrator, said comparator being connected to said output terminal of said function generator to receive said output signal corresponding to the enthalpy and to said second input terminal to receive said second input signal for comparison with said output signal, said integrator being connected to said comparator to receive a difference signal for integration in response to a deviation of said output signal of said function generator from said second input signal, said integrator being connected to said second input of said function generator.

15. A device as set forth in claim 13 wherein said controller means is an integral action controller.

16. A device as set forth in claim 13 in which said function generator generatores a function of the form:

$$z = a_{00} + a_{01}x + a_{02}x^2 + a_{03}x^3 \ldots a_{0m}x^m$$
$$+ (a_{10} + a_{11}x + a_{12}x^2 \ldots + a_{1m}x^m) \cdot Y$$
$$+ (a_{20} + a_{21}x + \ldots + a_{2m}x^m) \cdot Y^2$$
$$\cdot$$
$$\cdot$$
$$+ (a_{n0} + a_{n1}x + a_{n2}x^2 \ldots + a_{nm}x^m) \cdot Y^n.$$

where $y$ and $x$ are said first and second input signals and $z$ is said output signal.

* * * * *